United States Patent [19]

Pralus

[11] Patent Number: 5,895,602
[45] Date of Patent: Apr. 20, 1999

[54] METHOD AND APPARATUS FOR DIFFUSING STEAM DURING COOKING OR HEATING OF VARIOUS PRODUCTS

[76] Inventor: Georges Pralus, 20, rue de La Libération Briennon, 42720 Pouilly Sous Charlieu, France

[21] Appl. No.: 08/952,662

[22] PCT Filed: May 31, 1996

[86] PCT No.: PCT/FR96/00822

§ 371 Date: Dec. 1, 1997

§ 102(e) Date: Dec. 1, 1997

[87] PCT Pub. No.: WO96/38076

PCT Pub. Date: Dec. 5, 1996

[30] Foreign Application Priority Data

Jun. 2, 1995 [FR] France ................. 95 06795

[51] Int. Cl.[6] ............................................ H05B 6/80
[52] U.S. Cl. ..................................................... 219/731
[58] Field of Search ................................ 219/731, 682, 219/461, 401, 686

[56] References Cited

U.S. PATENT DOCUMENTS

| | | | |
|---|---|---|---|
| 4,316,070 | 2/1982 | Prosise et al. | 219/10.55 |
| 4,465,234 | 8/1984 | Maehara et al. | 239/102 |
| 4,821,709 | 4/1989 | Jensen et al. | 128/204.21 |
| 5,343,551 | 8/1994 | Glucksman et al. | 392/405 |
| 5,525,782 | 6/1996 | Yoneno et al. | 219/682 |

*Primary Examiner*—Teresa Walberg
*Assistant Examiner*—Jeffrey Pwu
*Attorney, Agent, or Firm*—Bacon & Thomas, PLLC

[57] ABSTRACT

An apparatus intended to be used for cooking or heating various products in combination with an oven including a cavity (5) accessible through a door (7) and an energy generator (2). The apparatus includes an element (8) made of a fluid-retaining and energy-permeable porous material of which at least one of its portions is interposed between the generator (2) and the cavity (5), and a fluid-impervious and energy-transparent spacer element (13) interposed between the porous element (8) and the generator (2) to protect the generator (2) from steam in the cavity 5. According to the invention, the apparatus includes a mechanism (9) which causes a relative displacement between the porous element (8) and the generator (2) to change the portion of the porous element placed opposite the generator (2).

14 Claims, 2 Drawing Sheets

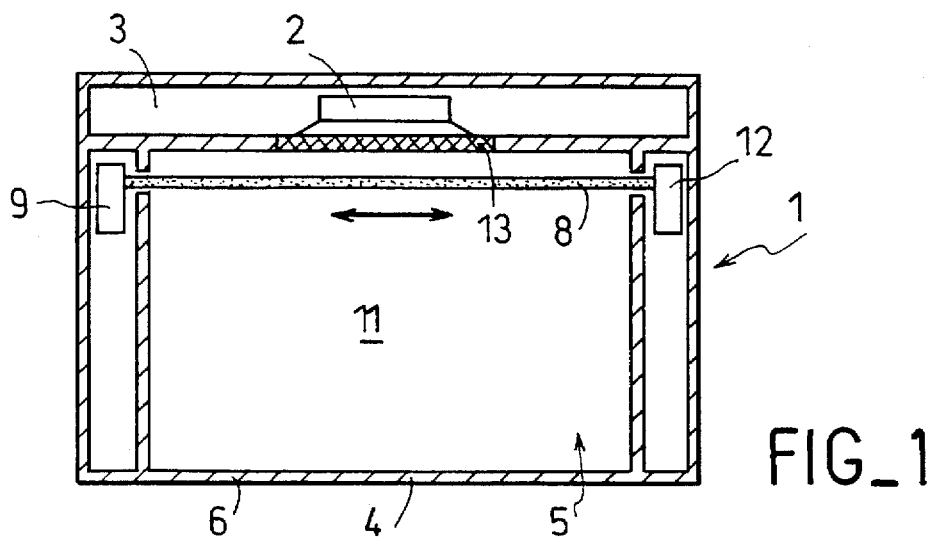
FIG_1
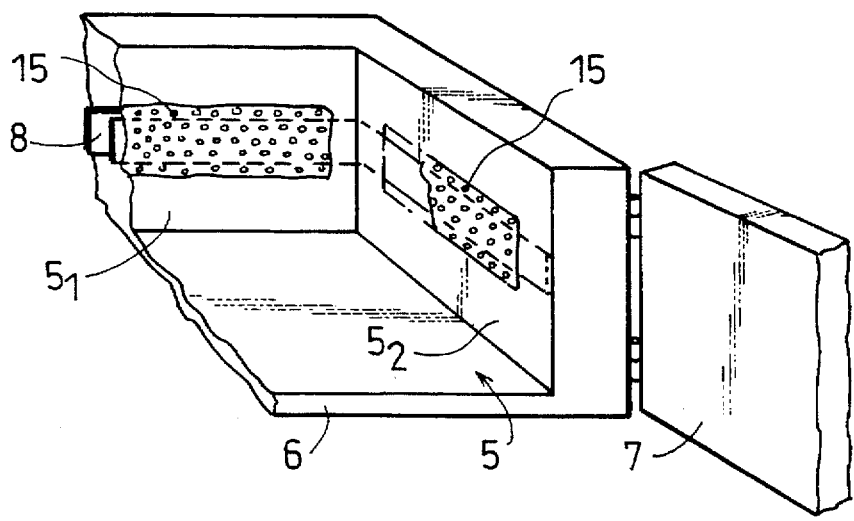
FIG_2
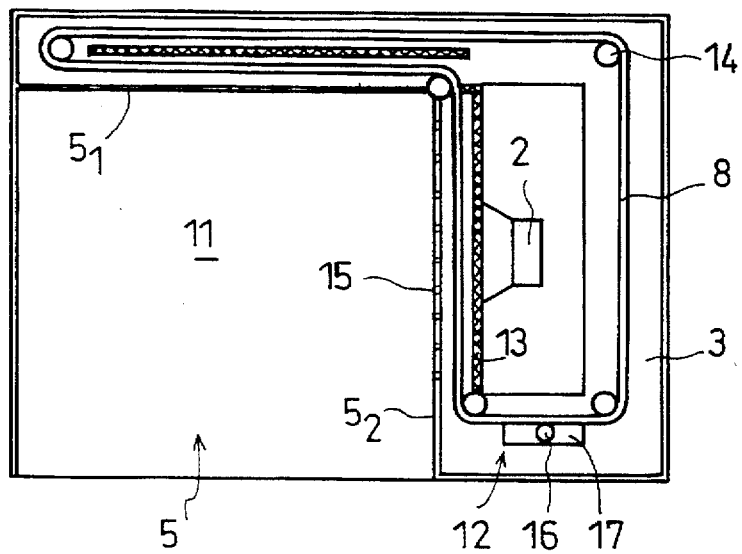
FIG_3

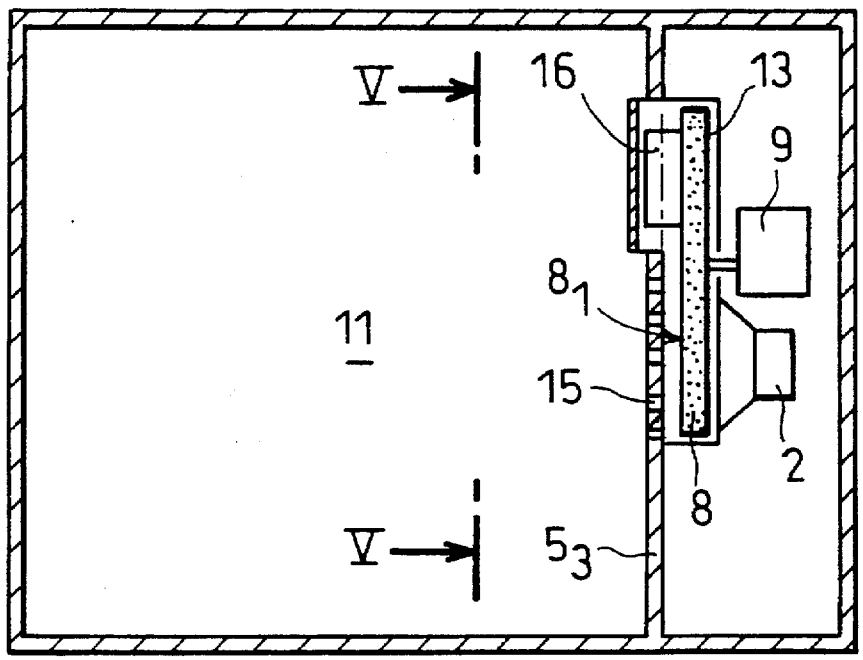
FIG_4
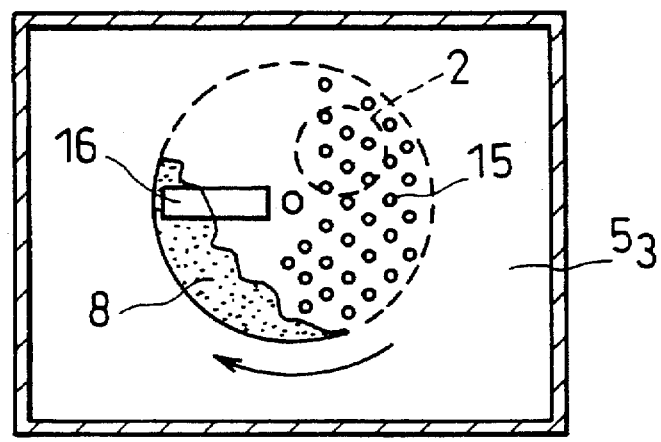
FIG_5

METHOD AND APPARATUS FOR DIFFUSING STEAM DURING COOKING OR HEATING OF VARIOUS PRODUCTS

TECHNICAL DOMAIN

The present invention relates to the domain of heating and cooking various products with the aid of thermic or electromagnetic energy, and in particular it concerns the domain of heating or cooking by application of an energy, for example infra-red, inductive or preferably micro-wave.

PRIOR ART

In the domain of heating or cooking various products by micro-waves, the products to be heated or cooked are disposed on a support placed in a closed application cavity.

Although the application of micro-waves effectively makes it possible to heat or cook a product, it has been ascertained that, by proceeding thus, the heated or cooked product no longer has the same qualities as those presented by the same product subjected to a different mode of heating or cooling.

This is particularly the case in the preferred but non-exclusive domain of application of the baking or heating of foodstuffs which are reputed to lose in part their organoleptic and/or nutritional qualities, after having been subjected to the action of micro-waves. The physical character of certain foodstuffs may in certain cases even by affected by the splitting or breaking of the outer skin, tegument, pod or other envelope. This seems to be due to the agitation of the free and trapped molecules of water of which the dissociation provokes the emission of diffusing steam, entraining therewith at least certain of the principles of the product which is thus found in a state which may be qualified as partly degraded.

The state of the art has proposed various techniques to bring a solution to the problems raised hereinabove. For example, Patent Appln. FR-A-2 501 031 describes a steam-cooking apparatus insertable in a micro-wave oven. According to the teaching disclosed, the apparatus comprises a recipient transparent to micro-waves containing at least in part a recipient reflecting the micro-waves and having a perforated bottom spaced from the bottom of the transparent recipient to define a reservoir adapted to contain a reserve of water. The apparatus is completed by a lid.

It should be noted that such an apparatus presents a complex and cumbersome structure with which two negative aspects detrimental for wide commercial diffusion are associated. The first lies in the cost and the practical aspect of use, such as positioning and cleaning. The second concerns the substantial reduction of the inherent useful volume and of that of the application cavities of the micro-wave ovens.

European Patent 0 334 572 also discloses a device designed to preserve the intrinsic qualities of the products and in particular the organoleptic and nutritional qualities of a foodstuff, while offering simplicity of use. The device comprises an element of which at least a wall is interposed between the enclosure and the generator, this element being made of a water-retaining porous matter, being provided with a water-tight coating, apart from on its face directed towards the inside of the baking-heating enclosure. Such a device is satisfactory in practice, insofar as it renders possible cooking or heating by micro-waves, preserving the smooth character of the foodstuffs, similarly to the traditional mode of cooking by oven or steam.

Although such a device is satisfactory in practice, it must be ascertained that this proposition does not make it possible to control the generation of steam produced in the enclosure. Furthermore, it has been ascertained that the water-retention element is capable of being locally overheated in its part placed opposite the micro-wave generator. It has also proved that the diffusion of the steam, within the enclosure, is not really homogeneous, particularly for enclosures of relatively large capacity.

If the control of the steam within an enclosure represents a major drawback for micro-wave ovens, it must be considered that such a problem is also raised for the other types of oven, namely, for example, induction or infra-red ovens.

The need is thus apparent of having available a technique making it possible to control the steam introduced inside a heating or cooking enclosure, in which microwaves, and more generally a thermic or electromagnetic energy, are applied.

It is an object of the invention to satisfy this need by proposing a technique capable of being used for cooking or heating products and, more particularly, of foodstuffs by application of an energy, in the general sense, offering the advantage of allowing a relatively precise control of the homogeneity and quantity of steam introduced inside the cooking or heating enclosure, with a view to optimalizing the quality of the products heated or cooked.

Another object of the invention is to propose a technique adapted to allow the diffusion, within the cooking-heating enclosure, of steam coming from a liquid and/or a solid in the general sense.

SUMMARY OF THE INVENTION

In order to attain these objects, the invention relates to a method for cooking-heating various products in an oven comprising a cavity and an energy generator in front of which is placed at least a portion of an element made of a porous, fluid-retaining material to ensure generation of steam in the enclosure, a fluid-impervious and energy-transparent spacer element being interposed between the generator and the porous element.

According to the invention, the method comprises causing a relative displacement between the generator and the porous element, so as to change the portion of the porous element placed opposite the generator.

The object of the invention also aims at proposing an apparatus intended to be used for cooking-heating various products in combination with an oven comprising a cavity accessed through a door and an energy generator, the apparatus comprising an element made of a porous, fluid-retaining and energy-permeable material, of which at least one of its portions is interposed between the generator and the cavity, and a fluid-impervious and energy-transparent spacer element interposed between the element and the generator, in order to protect the latter from the steam from the fluid.

According to the invention, the apparatus comprises means for causing a relative displacement between the porous element and the generator to change the portion of porous element placed opposite the generator.

Various other characteristics will appear from the description given hereinafter with reference to the accompanying drawings which show, by way of non-limiting examples, forms of embodiment of the object of the invention.

BRIEF DESCRIPTION OF THE DRAWINGS

FIG. 1 is a general view showing the principle of operation of the apparatus according to the invention.

FIG. 2 is a partial perspective view of a form of embodiment of an apparatus according to the invention.

FIG. 3 is a section from above of the embodiment illustrated in FIG. 2.

FIG. 4 is a view in section from above showing another embodiment of an apparatus according to the invention.

FIG. 5 is a view in elevation taken substantially along lines V—V of FIG. 4.

BEST WAY OF CARRYING OUT THE INVENTION

FIG. 1 shows an oven 1 for cooking or heating products, in particular foodstuffs, by application of an energy delivered by a thermic or electromagnetic generator 2. The generator 2 is of the infra-red, induction or, preferably, microwave type, for example. In the example illustrated in FIG. 1, the oven 1 comprises, for example, on its top, a compartment 3 in which is placed the generator 2 and, below, a compartment 4 for use, defining a cavity 5 open on at least one facade side 6 and provided with a door 7 preferably presenting a glass panel (not shown). The apparatus according to the invention comprises an element 8 made of a porous material for retaining a fluid in the general sense, compatible with the fiction of food and permeable to the energy delivered by the generator 2. The porous character of the raw material of the element 8 must be understood as responding to the aptitude of being able to ensure retention of a reserve of fluid and, in particular,of a liquid such as water associated or not with additives or adjuvants. The element 8 is partially or completely made, for example, of clay, porous sandstone or of textile material. Moreover, the energy-permeable character of the element 8 corresponds to its faculty of allowing the energy delivered by the generator 2 to raise the temperature of the included fluid, in order to obtain vaporization thereof. In this respect, if the generator 2 is of the induction type, the porous element 8 comprises, of course, a metallic coupling part.

In accordance with the invention, it is provided to cause a relative displacement between the generator 2 and the porous element 8, in order to displace or change that portion of the porous element placed opposite the generator 2. In the embodiment illustrated in FIG. 1, the element 8 is intended to be displaced by drive means 9 causing advancement of the element 8 in front of the generator 2. In the example illustrated, the element 8 is made so as to be able to be inserted in the cavity 5, so as to be interposed between the products to be cooked or heated and the generator 2. In general, the element 8 is placed facing the opening of the generator. The element 8 thus defines, in cavity 5, a cooking-heating enclosure 11, of which at least one side is formed, at least partially, by the element 8. It must be considered that the element 8 presents a dimension equal to or preferably less than the surface of the wall of the cavity 5 placed opposite and formed, in the example illustrated, by the top wall of the compartment 4.

In a preferred embodiment, the element 8 is in the form of a supple band, of which each of the ends is connected to a drive system making it possible to obtain a reciprocating displacement of the band in front of the generator 2. The drive means 9 are constituted for example by two drive drums on which is fixed one end of the band, one of the drums being motorized, while the other exerts a return torque.

According to a characteristic of the invention, the element 8 is recharged with fluid via a supply station 12 placed on the path of the element 8, so as to imbibe it with fluid. By way of example, station 12 may be constituted by a apparatus for spraying the fluid on the band or by a reserve of fluid, in which the band is immersed during its passage inside the station. The fluid may be in the form of a liquid, such as pure water or water to which one or more soluble susbstances have been added, at least in part. The fluid may for example thus be constituted by water, an infusion or a decoction of plants.

The apparatus according to the invention also comprises a spacer element 13 made of a fluid-impervious material transparent to the energy delivered by the generator 2, preferably of food quality and adapted to withstand a relatively high temperature at least equal to 100° C. The spacer element 13 is interposed between the element 8 and the generator 2. The spacer element 13 thus allows the energy produced by the generator 2 to pass, while protecting the generator 2 from the steam from the fluid. In the example illustrated, the spacer element 13 is fixedly mounted on the top wall defining the cavity 5 and at least over the whole portion placed opposite the generator 2. According to another embodiment (not shown), it should be noted that the spacer element 13 may be fitted or mounted directly on the element 8, so as to constitute a fluid-impervious coating, apart from on that face of the element located opposite the cavity 5. In that case, the element 8 is placed so that its face bereft of the tight coating is oriented towards the inside of the enclosure 11.

Operation of the apparatus according to the invention follows directly from the foregoing description. After switch-on, the energy delivered by the generator 2 traverses the porous element 8 before reaching the product to be cooked or heated, placed in the cavity 5. The element 8 thus behaves as an intermediate barrier generating a vaporization of included liquid which, by reason of the spacer element 13, diffuses solely in the confinement volume 11 of the cavity 5. Simultaneously, the drive means 9 cause advancement of the element 8 in front of the source 2, with the result that that portion of the element 8 placed opposite the generator 2, changes. It must be considered that the drive of the porous element 8 makes it possible to pass in front of the generator 2 several zones or portions of the porous element. Preferably but non-exclusively, the advance of the porous element 8 is continuous and, in the example illustrated in FIG. 1, reciprocating. Of course, it may be envisaged that the movement of the element 8 is discontinuous or jerky, with a determined pitch of displacement and rate.

It must be noted that the use of a dynamic porous element 8 makes it possible to obtain, with respect to a static porous element, that a larger portion of the porous element participates in the diffusion of the steam within the enclosure 5. It thus appears that the element 8 is not subjected punctually to a rise in temperature, which makes it possible to guarantee good safety of the apparatus. Moreover, it appears possible to control the quantity of steam diffused inside the cavity 5. Furthermore, it must be considered that a stirring of the molecules of fluid occurs for that portion of the porous element placed upstream of the source 2, thus making it possible to create micro-vapours diffusing inside the cavity, with a view to obtaining uniform cooking. The steam thus diffuses over the major part of the displacement of the element, thus leading to a virtually homogeneous distribution of the steam within the cavity 5.

In the foregoing description, the porous element 8 is displaced, while the generator 2 is fixed. It is clear that the invention is also applicable to the use of a fixed porous element 8, with respect to which the generator 2 is displaced. The application of the energy to various portions of the porous element 8 makes it possible to obtain the different advantages described hereinabove. It must be noted that, in the foregoing description, the generator 2 is adapted to perform a function of heating or of cooking of the products placed inside the enclosure. Of course, the generator 2 may be designed to perform solely a function of vaporization of the fluid included in the porous element 8, the function of cooking or of heating being ensured at least by another generator disposed to intervene, or not, on the process of steam-production.

In the example illustrated in FIG. 1, the porous element 8 is displaced in advance solely in relation with one of the faces defining the cavity 5. FIGS. 2 and 3 illustrate another embodiment in which the porous element 8 is displaced with regard to the bottom wall and one of the side walls. In accordance with this embodiment, the porous element 8 is in the form of an endless band, mounted between different guide rollers 14 placed to allow its displacement in relation with the bottom wall $5_1$ and a side wall $5_2$. The porous element 8 is mounted outside the cavity 5, being established inside a generator compartment 3 and a compartment formed in relation with the bottom wall $5_1$. Advantageously, the bottom and side walls $5_1$ and $5_2$ comprise perforations 15 made to allow the diffusion, inside the cavity 5, of the steam generated by the porous element 8. According to this embodiment, the spacer element 13 is disposed between the generator 2 and the band 8 to avoid the diffusion of the steam towards the source 2. The band 8 is driven in advance via, for example, one of the guide rollers 14, coupled to a gear motor (not shown). The compartment 3 advantageously comprises the fluid supply station 12 constituted, in the example illustrated, by one or more supply rollers 16 in abutment on the band 8 and partly immersed in a tank 17 or impregnated by the fluid.

Such a variant embodiment offers the advantage of allowing the assembly of the apparatus according to the invention outside the cooling-heating enclosure 11. Of course, it might be envisaged to mount the band 8 inside the cooking-heating enclosure 11. Moreover, in the example illustrated, the band advances in relation with two walls of the enclosure 11. Of course, it may be envisaged to mount the band differently, for example opposite the sole, the ceiling and the two vertical walls of the oven.

FIGS. 4 and 5 show another embodiment of a apparatus according to the invention in which the porous element 8 is displaced by means 9 for driving in rotation. According to this example, the porous element 8 is made in the form of a disc driven in rotation, about its central axis, by a gear motor 9. Part of the disc, for example substantially a quarter of its surface, is placed in relation with the generator 2. A spacer element 13 is placed between the generator 2 and the porous element 8. In the example illustrated, the spacer element 13 is made on all the faces of the porous element 8, apart from the one 81 oriented towards the inside of the enclosure 11. Of course, the energy-permeable spacer element 13 may be fixedly mounted between the porous disc 8 and the generator 2, surrounding all the faces of the porous element, apart from the one $8_2$ oriented towards the enclosure 11.

The porous element 8 advances in front of a wall $5_3$ defining the cavity 11 and comprising holes 15 for passage of the steam. The holes 15 for passage are made on that portion of the wall placed opposite the generator and, advantageously, upstream of the generator in the direction of rotation of the disc, so as to allow the micro-vapours generated after passage of the porous element in front of the source 2, to exit. The face $8_1$ of the element, not provided with the spacer element 13, is advantageously in contact with a fluid supply roller 16, making it possible to imbibe the disc 8 with fluid.

The drive means 9 are controlled by a control unit (not shown) preferably allowing the continuous advance of the porous element 8. Of course, it may be envisaged to control the means 9 so as to obtain a jerky or discontinuous advance of the disc. Similarly, it may be envisaged to control the porous element 8 in intermittent displacement as a function of the conditions of use of the oven.

Possibility of industrial application

The object of the invention is particularly advantageously applied to equipping a cooking-heating oven equipped with a source of production of an energy of any nature and, preferably, micro-wave.

I claim:

1. Method for cooking-heating various products in an oven comprising a cavity (5) and an energy generator (2) in front of which is placed at least a portion of an element (8) made of a porous fluid-retaining material in order to ensure generation of steam in the enclosure, a fluid-impervious and energy-transparent spacer element (13) being interposed between the generator (2) and the porous element (8), the method comprising the step of:

causing a relative displacement between the generator (2) and the porous element (8), so as to change that portion of the porous element placed opposite the generator (2).

2. Method according to claim 1, wherein the porous element (8) is displaced to cause advancement of at least one of its portions in front of the generator (2).

3. Method according to claim 1, wherein the generator (2) is displaced in relation with the porous element (8).

4. Method according to claim 2, further comprising the step of:

causing displacement of the porous element (8) in relation with at least one fluid supply station (12) allowing the fluid to be brought to the porous element (8).

5. Method according to claim 2, further comprising the step of:

causing the displacement of the spacer element (13) which is fitted on the porous element (8).

6. Method according to claim 1, wherein causing the relative displacement between the generator (2) and the porous element (8) is accomplished by causing linear displacement of the porous element (8) in front of the generator (2).

7. Method according to claim 1, further comprising the step of:

arranging, at least in front of the generator (2), a passage (15) for communication between the porous element (8) and the cavity (5), in order to ensure vaporization of the fluid therein.

8. Apparatus intended to be used for cooking-heating various products in combination with an oven comprising a cavity (5) accessible through a door (7) and an energy generator (2), the apparatus comprising:

an element (8) made of fluid-retaining and energy-permeable porous material of which at least one of its portions is interposed between the generator (2) and the cavity (5);

a fluid-impervious and energy-transparent spacer element (13) interposed between the porous element (8) and the generator (2) to protect the generator (2) from steam in the cavity (5); and means (9) for causing a relative displacement between the porous element (8) and the generator (2) to change that portion of the porous element placed opposite the generator (2).

9. Apparatus according to claim 8, wherein the displacement causing means (9) are means for driving the porous element (8).

10. Apparatus according to claim 8, further comprising:

fluid supply means (12) arranged to feed the element (8) with fluid during displacement thereof.

11. Apparatus according to claim 8, wherein the spacer element (13) is integrated with the porous element (8) and the displacement causing means (9) causes displacement of the spacer element (13) and the porous element (8).

12. Method according to claim 1, wherein causing the relative displacement between the generator (2) and the porous element (8) is accomplished by causing rotating displacement of the porous element (8) in front of the generator (2).

13. A cooking-heating oven, comprising:

a cavity (5) which is accessible through a door (7);

an energy generator (2) in the cavity (5);

an element (8) made of fluid-retaining and energy-permeable porous material of which at least one of its portions is interposed between the generator (2) and the cavity (5);

a fluid-impervious and energy-transparent spacer element (13) interposed between the porous element (8) and the generator (2) to protect the generator (2) from steam in the cavity (5); and means (9) for causing a relative displacement between the porous element (8) and the generator (2) to change that portion of the porous element placed opposite the generator (2).

14. A cooking-heating oven according to claim 13, further comprising:

passages (15) for communication between the porous element (8) and the cavity (5), the passages (15) being at least in front of the generator (2).

* * * * *